United States Patent [19]

Tanaga et al.

[11] Patent Number: 4,847,586
[45] Date of Patent: Jul. 11, 1989

[54] PRESSURE DETECTOR

[75] Inventors: Shigenori Tanaga, Kohjimachi; Hideo Iida, Inamachi, both of Japan

[73] Assignee: Kokoku Rubber Industry Company Limited, Kohjmachi, Japan

[21] Appl. No.: 123,813

[22] Filed: Nov. 23, 1987

[51] Int. Cl.⁴ ............................................. H01C 10/10
[52] U.S. Cl. ........................................ 338/114; 338/99
[58] Field of Search ........................... 338/114, 99, 101

[56] References Cited

U.S. PATENT DOCUMENTS 4,163,204 7/1979 Sado et al. ............................ 338/114
4,571,542 2/1986 Arai ................................. 338/114 X Primary Examiner—Clifford C. Shaw
Assistant Examiner—M. M. Lateef
Attorney, Agent, or Firm—Gifford, Groh, Sheridan, Sprinkle and Dolgorukov

[57] ABSTRACT

There provided is a pressure detector accurate in operation and high in reproducibility to have a resistance circuit substrate provided with at least one pair of electrodes and forming a resistance circuit between the electrodes through printing or other means, a block contact maker formed of a conductive elastic material to a shape ready for deforming, which is characterized in that the block contact maker is kept in contact with the resistance circuit substrate at all times, the block contact maker is deformed according as the state shifts from non-pressurized to pressurized to change a contact area gradually with the resistance circuit substrate, thus forming a variable resistance circuit parallel electrically with the resistance circuit substrate.

6 Claims, 4 Drawing Sheets

PRESSURE DETECTOR

BACKGROUND OF THE INVENTION

1. Field of the Invention

The present invention relates to a pressure detector operable as pressure sensor or pressure switch.

2. Description of the Prior Art

FIG. 11 and FIG. 12 represent a conductive rubber switch working as the prior art pressure detector disclosed, for example, in Japanese Utility Model Laid-Open No. 39523/1985. In the drawings, 1 denotes a conductive rubber sheet or comb-line electrode, 2 denotes another conductive sheet with at least three insulating projections 3 provided thereon at suitable intervals, and both the conductive rubber sheets 1, 2 are built up together through the insulating projections 3 so as not to come in contact with each other under non-pressurized state. A reference numeral 4 denotes a flexible sheet consisting of rubber or synthetic resin with at least one tapered projection 5 provided thereon at a position not to overlap with the insulating projections 3, which is placed over the conductive rubber sheet 2. Reference numerals 6, 7 denote electrodes, 8 denotes a power source, and 9 denotes an ammeter.

In a compound conductive rubber switch 10 in a layer-built structure constructed as above, when pressure is not applied on the flexible sheet 4, a resistance between the isolated electrodes 6, 7 is infinite, and thus no current flows any. If pressure is applied on the flexible sheet 4, then the conductive rubber sheet 2 is curved to touch the conductive rubber sheet 1 as directed by a chain line, and a series resistance circuit is formed between the electrodes 6, 7 to allow the current to flow therethrough. Since the current value changes according to the resistance which resistance changes in accordance with the pressure applied to the flexible sheet 4, the magnitude of the applied pressure is obtainable from measuring the current.

This prior art device relies on deformation of one sheet in order to achieve contact with the second sheet. The two sheets are separated by, and thus insulated by, the projections 3 when in the non-pressurized state. Among the disadvantages with such an arrangement are: (a) low pressure cannot be detected, (b) pressure detection involves a heavy dispersion and where the pressurized condition continues for a long period of time a permanent strain of the conductive sheets may result, (c) since a change in resistance value to the change in pressure is not linear, a correction by arithmetic circuit or the like is necessary, accordingly while the prior art detector is available for use on rough-and-ready detection of loads (for example, detection of the number of passing cars), it is no more serviceable for precise detection of loads (for example, weight measurement of objects).

SUMMARY OF THE INVENTION

The present invention relates to a pressure detector provided with a resistance circuit substrate having at least one pair of electrodes and forming a resistance circuit between the electrodes through printing or the like, a block contact maker formed of a conductive elastic material to a shape ready for deforming, which is characterized in that the block contact maker is kept in contact with the resistance circuit substrate at all times, the block contact maker is deformed according as the state shifts from non-pressurized to pressurized to change a contact area gradually with the resistance circuit substrate, thus forming a variable resistance circuit parallel electrically with the resistance circuit substrate.

The resistance circuit substrate in the invention is ready for adjusting to a necessary resistance value beforehand through printing or other means and further is capable of forming an arbitrary pattern thereon as occasion demands. On the other hand, the block contact maker consisting of a conductive elastic material is capable of forming each type of point contact, line contact, face contact and others according to a pattern of the resistance circuit. The contact makers are kept in contact with the resistance circuit substrate in non-pressurized state and thus are capable of detecting pressures from zero. Further, an initialization carried out on the resistance circuit is effective in securing a stable pressure detection. Still further, a change in the resistance value is measured only at a portion where the contact maker and the resistance circuit come in contact with each other, and each shape is specified to what is optimized, thereby obtaining a linear pressure/resistance value characteristic.

BRIEF DESCRIPTION OF THE DRAWINGS

FIG. 7 to FIG. 10 are graphs of experimental data relating to the invention, wherein FIG. 7 is a load (pressure)/resistance characteristic curve separate by resistance circuit pattern, FIG. 8 is a load/contact face characteristic curve with a contact maker thickness (d) as parameter, FIG. 9 is a load/resistance characteristic curve with the thickness (d) also as parameter, FIG. 10 is a load/resistance characteristic curve according to another construction.

DESCRIPTION OF PREFERRED EMBODIMENTS

Figure 1:
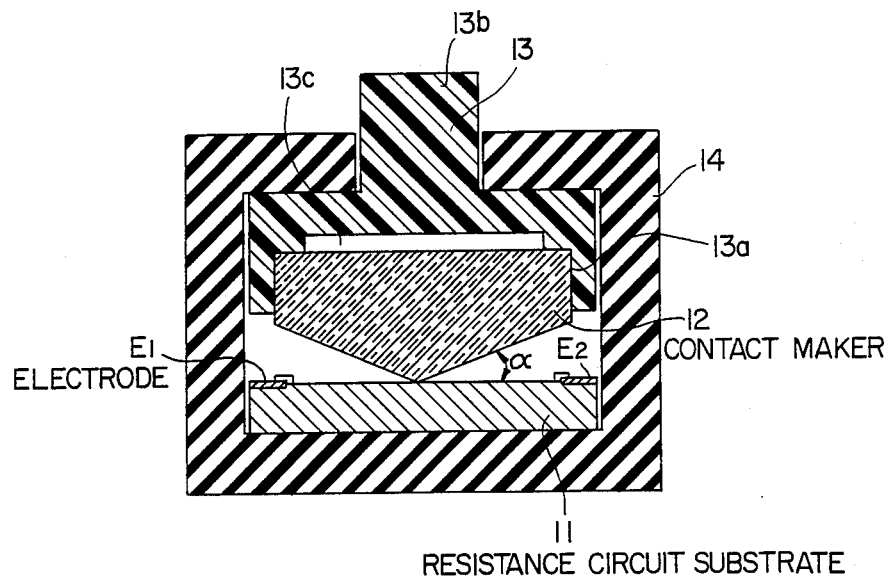
FIG. 1 is a longitudinal sectional view of one embodiment relating to the invention.

One embodiment of the invention will now be described with reference to the accompanying drawings. FIG. 1 is a longitudinal sectional side view of a pressure detector, wherein 11 denotes a resistance circuit substrate having at least one pair of electrodes $E_1$, $E_2$ with a predetermined circuit pattern formed thereon through printing or other means, 12 denotes a block contact maker kept in contact elastically at all times with the resistance circuit substrate 11 with its contact area changing according as the state shifts from non-pressurized to pressurized, 13 denotes a plunger for transferring an external force accurately to the contact maker 12 so as to bring the block contact maker 12 stably into contact with the resistance circuit substrate 11, and 14 denotes a case for enclosing the above components 11 to 13 therein.

Figures 2, 3:
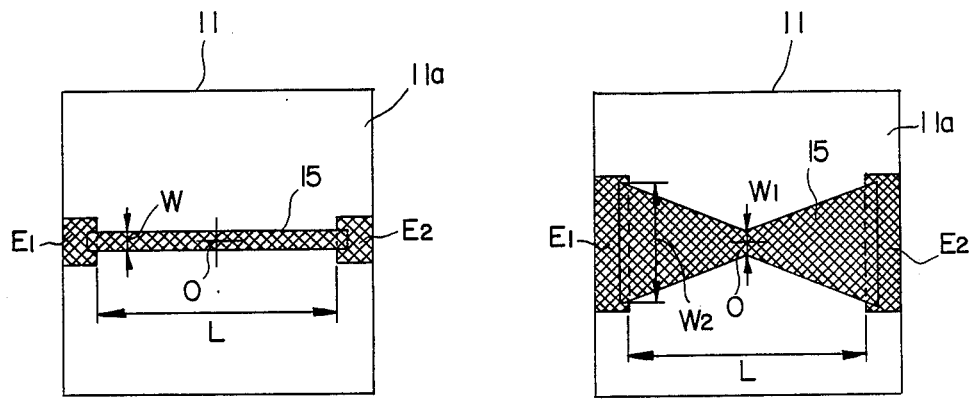
FIG. 2, FIG. 3, FIG. 4 are plan views each representing one example of a resistance circuit pattern of the invention.
Figure 4:
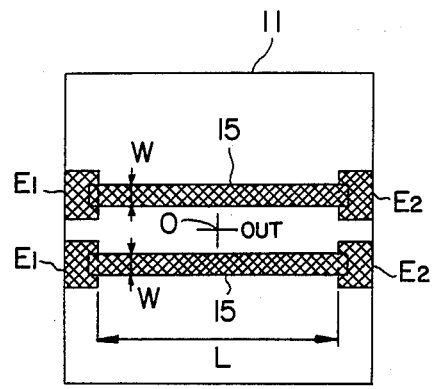

More specifically, the resistance circuit substrate 11 has the electrodes $E_1$, $E_2$ (plated with gold or the like, as occasion demands) consisting of copper or other material formed on the surface of a substrate 11a consisting of insulating resin material, and the electrodes $E_1$, $E_2$ are linked through a printed circuit 15 using a conductive ink. FIG. 2 to FIG. 4 exemplify a printed resistance circuit pattern formed as above, wherein that of FIG. 2 has the electrodes $E_1$, $E_2$ linked through the printed circuit 15 having one piece of wire pattern even in width. Then, that of FIG. 3 has the electrodes $E_1$, $E_2$ linked through the printed circuit 15 having a non-uniform pattern with the wire width narrowed most at the center and expanding as it comes near to the electrodes. That of FIG. 4 has the electrodes $E_1$ and $E_2$ disposed in two pair, each of which is linked through the printed circuit 15 having one piece of wire pattern even in width as in the case of FIG. 2, and the printed circuits 15, 15 formed in parallel are insulated therebetween.

Figure 5:
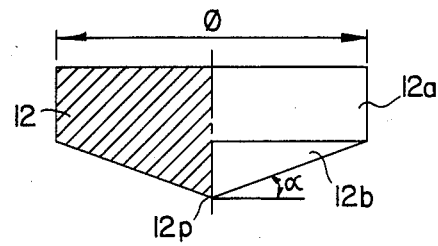
FIG. 5, FIG. 6 are semi-sectional side views representing an example of a contact maker of the invention.
Figure 6:
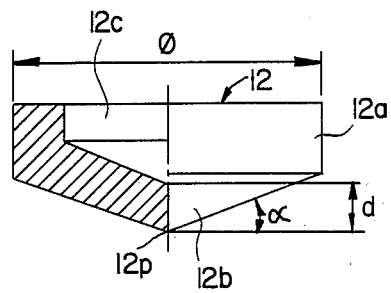

The block contact maker 12 is formed of a known conductive elastic material obtainable through adding a conducting agent such as carbon black or the like to a high molecular elastic material such as rubber or the like. It is preferable that the contact maker be shaped to have a point contact (or line contact) at a contact part with the resistance circuit substrate 11 when not pressurized but an increased area of the contact part according as pressure increases. FIG. 5 and FIG. 6 show one example of the shape, wherein that of FIG. 5 is formed to a solid structure having a cylindrical shell 12a and a conical head 12b with an angle of inclination $\alpha$, while that of FIG. 6 is formed to a structure with a recess 12c formed thereon but having a thickness (d) to the outline similar to the aforementioned. It is preferable that a specific resistance of such contact maker 12 be small by far as compared with a resistance between the electrodes $E_1$, $E_2$ of the printed resistance circuit 11.

The plunger 13 consists of an insulating material such as synthetic resin or the like, and is provided with a recession 13a for mounting the contact maker 12 therein on one end and a projection 13b for applying an external pressure on the other end. A reference character 13c denotes a recession for the contact maker 12 to escape when deformed on pressure. When the projection 13b coming out of the case 14 is depressed, the plunger 13 is guided by the inner wall of the case 14 in sliding, and thus in pressurizing the contact maker 12.

Various pressure/resistance characteristics are obtainable from combining the block contact maker 12 and each pattern of the resistance circuit substrate 11. That is, when the block contact maker 12 is combined with a resistance circuit pattern (hereinafter called "pattern A") shown in FIG. 2 and a resistance circuit pattern (hereinafter called "pattern B") shown in FIG. 3, it is incorporated so that a conical point 12P of the block contact maker 12 will be brought into contact with a center O of the printed circuit 15 of each pattern. An initial resistance of the pressure detector in such a case becomes a resistance $R_o$ (interelectrode resistance of pattern) of the printed resistance circuit itself, which can be controlled easily to a correct value beforehand by adjusting wire width, wire length and so forth. When a load on pressure increases from the initialized state through the plunger 13, a contact area of the printed circuit 15 and the point 12P of the contact maker 12 increases, and a portion whereat each comes in contact forms a parallel circuit electrically, thus decreasing the interelectrode resistance.

Now let an initial resistance of the printed resistance circuit be $R_o$, a resistance at the time of load F be R, a contact diameter of the contact maker 12 and the printed circuit 15 be D in this case, an interelectrode length of the ciruit be L, and a volume specific resistance value of the contact maker 12 be $\sigma$, then:

$$R = R_o - \frac{DR_o^2}{L(R_o + \sigma L)}$$

Since the contact diameter D is proportional to the load F, a resistance between terminals will decrease according as the load increases. If the contact diameter changes by $\Delta D$ at the time of load change $\Delta F$, a change $\Delta R$ of the resistance between terminals will be:

$$\Delta R = - \frac{\Delta D \cdot R_o^2}{L(R_o + \sigma L)}$$

Accordingly, $\Delta R$ decreases against an increase in $\Delta D$, and $\Delta R$ increases against a decrease in $\Delta D$.

Further, if $R_o$ is exceedingly large to $\sigma$, then $$\Delta R \approx - \frac{\Delta D}{L} R_0,$$

thus coming easily near to a straight line.

On the other hand, when the block contact maker 12 is combined with a resistance circuit pattern (hereinafter called "pattern C") shown in FIG. 4, it is incorporated so as to bring the conical point 12P of the contact maker 12 into contact with a center $O_{out}$ intermediate of the pattern C. Then, a current will be carried when the contact maker 12 is deformed at a given pressure or over to link both the printed circuits 15, 15, and thus the device functions as a pressure detector operating as a switch at the same time.

Next, a function will be described with reference to various experiments carried out therefor.

<EXAMPLE 1>

Figure 7:
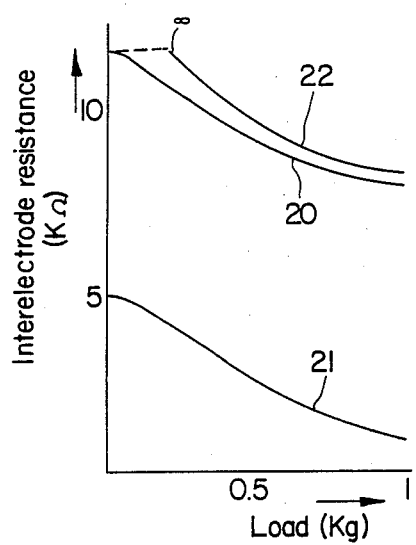

A contact maker (FIG. 5) $\phi$12 mm in outline and 20 degrees in angle of inclination $\alpha$ is prepared by means of a conductive silicone rubber KE-3601U (made by Shin-etsu Chemical Industry Co.), and from bringing it into contact with a resistance circuit substrate having the pattern A 0.5 mm in wire width W and 12 mm in interelectrode length L, a satisfactory reply efficiency is obtained such that an interelectrode resistance value 12 K$\Omega$ when no pressure is applied decreases to 8 K$\Omega$ gradually on a pressure applied at 1 kg (line 20 in FIG. 7).

<EXAMPLE 2>

From bringing a resistance circuit substrate of the pattern B 0.5 mm in central wire width $W_1$, 8 mm in wire width $W_2$ at electrode portions so expanding according as it comes near to the electrodes, and 12 mm in interelectrode length L into contact with the contact maker (FIG. 5), an exceedingly fine pressure response efficiency is obtained such that an interelectrode resistance value 5 K$\Omega$ when no pressure is applied changes almost linearly to 1 K$\Omega$ on a pressure applied at 1 kg (line 21 in FIG. 7).

<EXAMPLE 3>

From bringing a resistance circuit substrate of the pattern C with a resistance circuit 0.5 mm in wire width and 12 mm in interelectrode length L formed thereon in two pieces parallel 4 mm apart into contact with the contact maker (FIG. 5), a satisfactory pressure response efficiency is obtained such that an interelectrode resistance value infinite on a closed circuit and open circuit 12 KΩ when no pressure is applied decreases gradually to 8.5 KΩ on a pressure applied at 1 kg (line 22 minimum in FIG. 7).

In this case, a change in the interelectrode resistance value is not observed as far as 0.2 kg in pressurization on the closed circuit, the resistance value remains infinite on the open circuit, and the interelectrode resistance value comes to coincide with that on the closed circuit on a pressure applied at 0.2 kg or around in the case of open circuit, thus obtaining a pressure detector having a behavior as switch at the same time.

<EXAMPLE 4>

Figure 8:
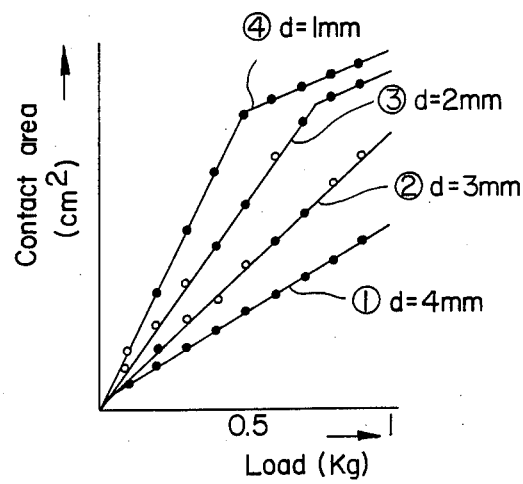

A contact maker (FIG. 6) φ12 mm in outside diameter, 15 degrees in angle of inclination α and having a recession 12c is prepared by means of a conductive silicone rubber SRX-539UF (made by Toray Silicone), and is brought into contact for pressurization with a resistance circuit substrate (FIG. 3) of the pattern B used in Example 2, thereby examining an influence to be exerted on the pressure response efficiency by interelectrode resistance due to a difference in the thickness d. FIG. 8 is a graph indicating a relation between pressure applied and contact area when the thickness d is ① 4 mm, ② 3 mm, ③ 2 mm, ④ 1 mm, from which it is understood that the contact area increases according as the pressure increases, and the rate of increase in contact area to pressure becomes high according as the thickness is thinned.

Figure 9:
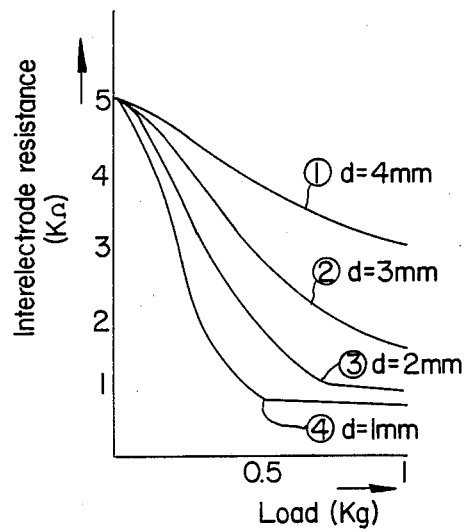

FIG. 9 is a graph indicating a change in pressure response efficiency of the interelectrode resistance value according to a change in the thickness d. It is understood from the graph that the thickness d of the contact maker is concerned largely with the pressure response efficiency, size and shape must be changed according to a range of pressures consequently the contact maker is deformed according to the pressure to a change in the contact area by comparing FIG. 8 and FIG. 9, thus changing the interelectrode resistance.

Figure 10:
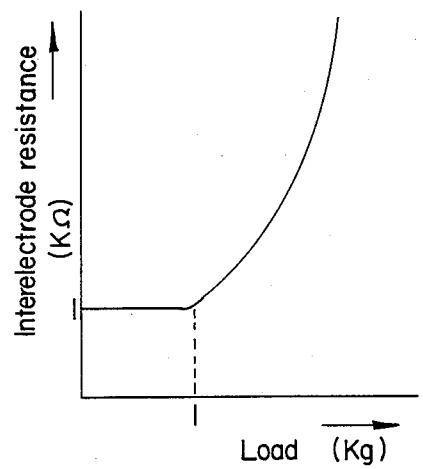
Figure 11:
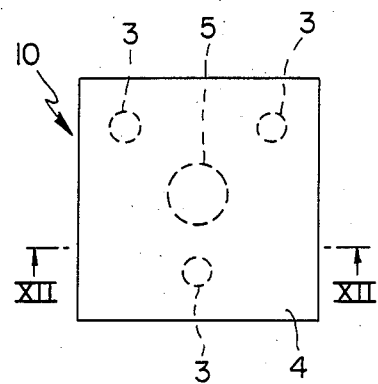
FIG. 11 is a plan view representing one example of a prior art pressure detector.
Figure 12:
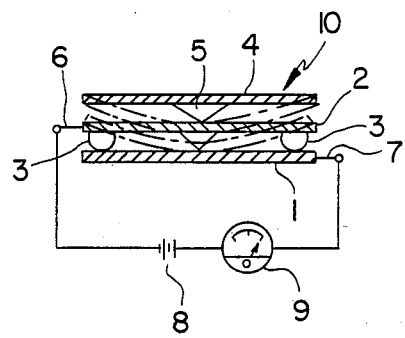
FIG. 12 is a sectional view taken on line XII—XII of FIG. 11.

Then, according to a pressure detector (not indicated) constructed such that a load applied through a spring may decrease from keeping the contact maker 12 into contact with the resistance circuit substrate 11 with the 1 kg load applied thereon through the spring beforehand to deformation and then applying an external pressure thereto, there obtained is a characteristic that the interelectrode resistance value gradually increases whenever the external pressure works at 1 kg or over (FIG. 10).

As described above, according to the invention, (a) since the contact maker is kept in contact with the resistance circuit substrate in non-pressurized state, pressure can be detected from zero, and (b) since an initial value is set by the resistance circuit, pressure can be detected stably. Further, (c) a change in the resistance value is measured only at a portion where the contact maker is kept in contact with the resistance circuit, and shapes of the contact maker and the resistance circuit are determined according to the requirement of pressure detecting range, thereby linearizing change in the resistance value correspondingly to a pressure change. The invention comprising such improvement may realize an accurate pressure detection which has never been ensured hitherto, and thus is capable of providing a pressure detector cheaper and more practical than metallic sensor or semiconductor sensor which is a generalized prior art pressure sensor.

What is claimed is:

1. A pressure detector provided with a resistance circuit substrate having at least one pair of electrodes, and forming a first resistance circuit extending between the electrodes, and a block contact maker formed of a deformable conductive pressure sensitive elastic material having a variable resistance sensitive to pressure, which is characterized in that the block contact maker is physically in contact with said first resistance circuit substrate at all times and forms a second resistance circuit with at least a portion of said first resistance circuit, the block contact maker being deformable under variations in pressure exerted thereon to change the contact between said first resistance circuit and said block contact maker in accordance with said variations, said block contact member thus forming a variable resistance circuit parallel electrically with said first resistance circuit.

2. A pressure detector according to claim 1, wherein a plunger is coupled to said block contact marker in pressure transmitting relationship therewith, and pressure is applicable to said block contact maker through said plunger to vary the contact between said circuits.

3. A pressure detector according to claim 2, wherein the block contact maker consisting of a conductive elastic material is in contact with said first resistance circuit when pressure is not applied, but increases its area of contact with said first circuit as pressure increases.

4. A pressure detector according to claim 3, wherein the plunger for holding and coupling the block contact maker is provided with a recess for absorbing a pressurized deformation of the block contact maker therein.

5. A pressure detector according to claim 1, wherein said first resistance circuit with which the block contact maker is kept in contact at all times has at least one pair of electrodes provided on the surface of a substrate consisting of an insulating resin material and is formed as a printed circuit of a desired pattern using a conductive ink extending between the electrodes.

6. A pressure detector comprising an exposed electrical conductor forming at least a portion of a circuit extending between a pair of electrodes, a contact member formed of a deformable electrically conductive elastic material facing said exposed conductor, means maintaining said contact member in facing relationship with and in contact with said exposed conductor, said contact member having at least a portion of a surface facing said conductor extending at an angle laterally with respect to said conductor from a point of contact with said conductor, means for pressing said contact member against said conductor to vary the slope of said surface with respect to said conductor and thereby the amount of contact between said contact member and said conductor along said surface, whereby said contact member forms a parallel electrical circuit with said conductor by virtue of its contact therewith of a resistance varying in accordance with the variations in the contact between said contact member and said conductor along said conductor.

* * * * *